(12) United States Patent
Baldwin et al.

(10) Patent No.: US 8,826,262 B2
(45) Date of Patent: Sep. 2, 2014

(54) REALTIME TRACKING OF SOFTWARE COMPONENTS

(75) Inventors: Timothy J. Baldwin, Winchester (GB);
Peter J. Johnson, Winchester (GB);
David Locke, Winchester (GB);
Fenglian Xu, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 13/448,710

(22) Filed: Apr. 17, 2012

(65) Prior Publication Data

US 2012/0304151 A1 Nov. 29, 2012

(30) Foreign Application Priority Data

May 27, 2011 (EP) .................................... 11167847

(51) Int. Cl.
*G06F 9/445* (2006.01)
(52) U.S. Cl.
CPC ...................................... *G06F 8/65* (2013.01)
USPC .......................................... 717/168; 717/178

(58) Field of Classification Search
None
See application file for complete search history.

(56) References Cited

U.S. PATENT DOCUMENTS

2004/0019878 A1 1/2004 Kotnur et al.
2005/0210442 A1* 9/2005 Seetharaman et al. ........ 717/101
2006/0242077 A1 10/2006 Dettinger et al.

\* cited by examiner

*Primary Examiner* — Chuck Kendall
(74) *Attorney, Agent, or Firm* — Patents on Demand P.A.; Brian K. Buchheit; Scott M. Garrett

(57) ABSTRACT

The disclosure is for run-time accessing a software component is provided, together with a computer system embodying the same, and a software utility directing the method. Initially a software component is loaded and analyzed to identify one or more features thereof, which features are checked against a database. Following the check, the component is classified as one of at least first, second, and third component types. A first component type is run without amendment. A second component type is replaced by a component of equivalent functionality prior to running. A third component type is blocked from running.

19 Claims, 6 Drawing Sheets

REALTIME TRACKING OF SOFTWARE COMPONENTS

CROSS-REFERENCE TO RELATED APPLICATIONS

This application claims priority to the European Patent Application Serial No. 111.67847.0 entitled "REALTIME TRACKING OF SOFTWARE COMPONENTS", filed May 27, 2011.

BACKGROUND

The present invention relates to the technical field of computers and computing systems, and more specifically, to the identification and handling of open-source and other software components retrieved from a cloud computing environment or similar remote source which components, by virtue of their functionality and/or content, require particular modes for handling.

As will be well understood, the creation of bespoke software can be a lengthy and costly process. In recent years, there has been an increasing trend for software developers to make use of existing services and software solutions for specific tasks, with a common source for such services and solutions being the Internet or via other users on a shared network. Such sources are generally referred to as a cloud computing environment.

One common form of software available from cloud computing sources is so-called open-source software which tends to have few if any restrictions on use and modification for the private user. Open-source software can have drawbacks for the user wishing to incorporate a solution in a commercial product as open-source license terms (as in the well-known GPL for example) typically require that source code be made freely available for potential future developers—something that commercial product providers will be reluctant to do.

A user obtaining access to services in a cloud computing environment may have no idea whether the service uses software from various open-source projects, or has other characteristics that render it unsuitable for use or incorporation. Conversely a supplier of software services to be used in a cloud computing environment is much less likely to have knowledge of how those services will be used and therefore which parts of the code will be executed. Typically a provider of services (software utilities) to a cloud environment would decontaminate their software by manually scanning the source for keywords and would then either obtain legal clearance to ship their cloud products with the open-source still in, or remove the open-source.

Many software companies will use proprietary tools to assist the decontamination process, or will have customised in-house developed tools. An example of the latter is the CSAR (Code Scan, Analysis and Reporting) tool used by the present applicants. CSAR provides a static code analysis that is run, during the development phase of a software creation project, against the entire source code and searches for keywords and markers that might indicate the presence of open-source code that would need special review and clearance procedures. The decontamination process is manual and subject to error as the software stack can be large and complex to scan methodically. In addition, much time and resources may be "wasted" by scanning and decontaminating code that is never invoked.

BRIEF SUMMARY

Embodiments of the disclosure are for run-time accessing a software component is provided, together with a computer system embodying the same, and a software utility directing the method. Initially a software component is loaded and analysed to identify one or more features thereof, which features are checked against a database. Following the check, the component is classified as one of at least first, second, and third component types. A first component type is run without amendment. A second component type is replaced by a component of equivalent functionality prior to running. A third component type is blocked from running.

DETAILED DESCRIPTION

Figure 1:
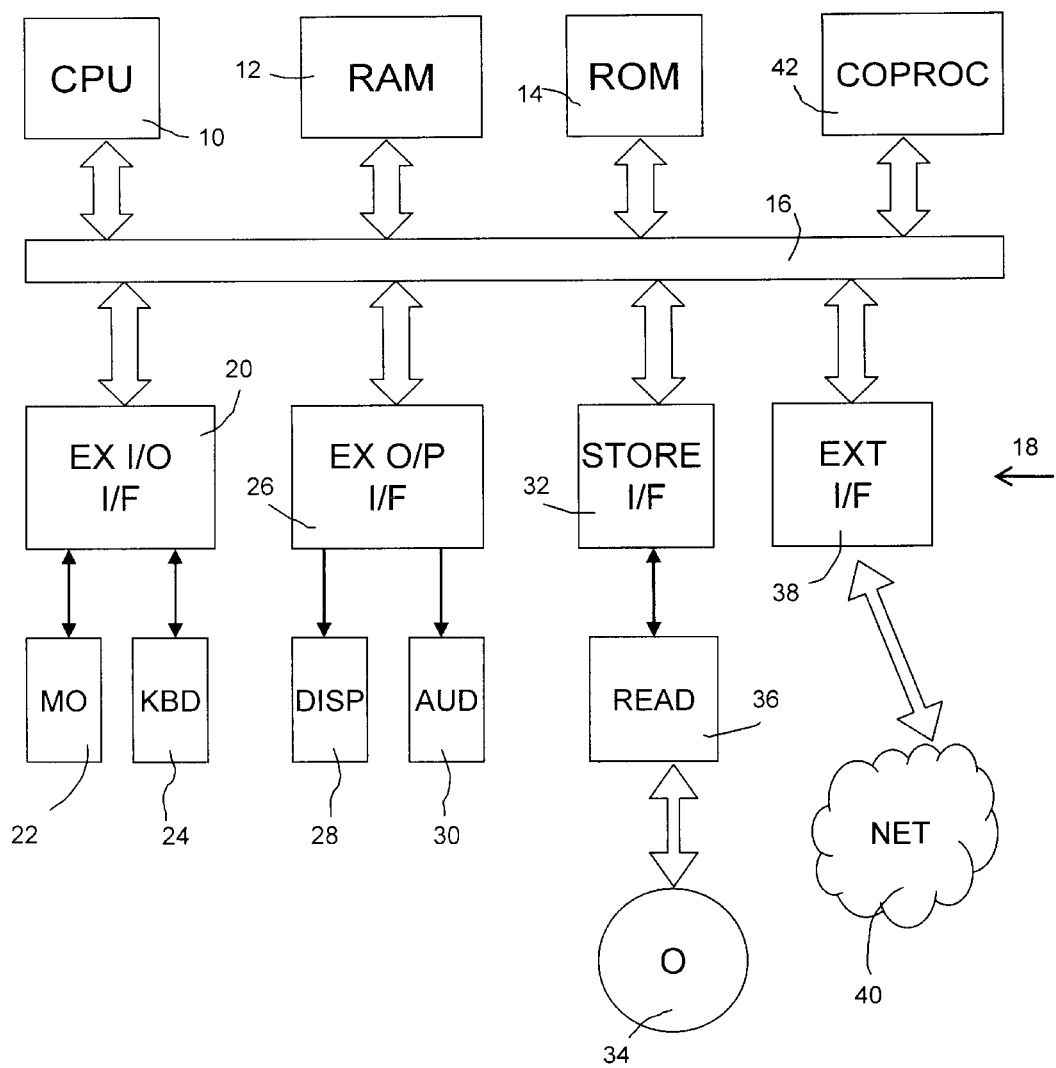
FIG. 1 is block schematic diagram of the components of a multiprocessor computer system suitable to embody the invention.

The cloud computing environment presents a number of potentially awkward situations to the software developer. One such problem may be that one of the components used within the cloud was an encryption package which has geographical usage restrictions (for example a requirement that it may not be provided to certain countries as it may provide strong encryption which could be used in a war against the component suppliers country).

What has not heretofore been provided by any known set of prior art references is a means to actively monitor software at run-time, which means do not simply block software code portions corresponding to a "banned" list, such as with known anti-virus software products.

Embodiments of the present invention can provide a means to support run-time accessing of software components, which components (or features thereof) have particular characteristics that indicate usage models beyond simply determining whether or not to block their usage.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to the figures, FIG. 1 schematically represents the components of a computer system suitable to embody the present invention. A first processor CPU 10 is coupled with random access memory RAM 12 and read only memory ROM 14 by an address and data bus 16. As will be understood, CPU 10 may comprise a cluster of processors (nodes) with individual processes and/or process threads being handled by individual nodes. Also connected to CPU 10 via the address and data bus 16 is at least one further processor 42 (or cluster of nodes), which may be a further CPU sharing tasks with the first CPU 10, or may be a coprocessor device supplementing the function of the CPU 10, handling processes such as floating point arithmetic, graphics processing, signal processing and encryption. Each of these internal hardware devices 10, 12, 14, 42 includes a respective interface (not shown) supporting connection to the bus 16. These interfaces are conventional in form and need not be described in further detail Also connected to the CPU 10 via bus 16 are a number of external hardware device interface stages (generally denoted 18). A first interface stage 20 supports the connection of external input/output devices, such as a mouse 22 and/or keyboard 24. A second interface stage 26 supports the connection of external output devices such as a display screen 28 and/or audio output device 30, such as headphones or speakers. A third interface stage 32 supports the connection to external data storage devices in the form of computer readable media: such external storage may as shown be provided by a removable optical or magnetic disc 34 (accessed by a suitably configured disc reader 36). Alternatively or additionally the external storage may be in the form of a solid state memory device such as an extension drive or memory stick. The external storage may contain a computer program, containing program software code portions which, when run by the CPU 10 and/or further processor 42, perform the method according to the present invention.

A fourth interface stage 38 supports connection of the system to remote devices or systems via wired or wireless networks 40, for example over a local area network LAN, via the internet, or another cloud computing source.

In a configuration according to the present invention, the computer system of FIG. 1 provides a processor device (CPU 10) hosting one or more software applications and a memory (such as RAM 12 and/or external storage 34) coupled with the processor and holding at least a database of software code portion features cross-referenced to a component type. The fourth interface stage 38 controlled by CPU 10 is connectable to a source of, and configured for run-time accessing of, software components to be used by a software application running on CPU 10. The external network (fourth) interface is further configured to perform the following steps, either independently or under the direction of CPU 10 or further processor 42:

load a software component;
analyze the component by identifying one or more features thereof and checking said one or more features against the database held in memory;
classify the component as one of at least first, second and third component types.

As a result of this classification (discussed in greater detail below), the CPU 10, further processor 42, or processor capability provided to fourth interface 38, is configured to:

enable a component classified as a first component type to run without amendment;

replace a component classified as a second component type by a component of equivalent functionality prior to running (suitably from a library of such equivalent components held in RAM 12, ROM 14 or external storage 34); and block a component classified as a third component type (or any component whose type cannot be identified) from running.

In such a configuration of computer system, the fourth interface 38 may be further configured to give a secondary classification to a component classified as a first component type by the analysis step, said secondary classification indicating whether or not further analysis is required. This secondary classification of the first component type (which may be considered a fourth component type) is described in greater detail below.

Figure 2:
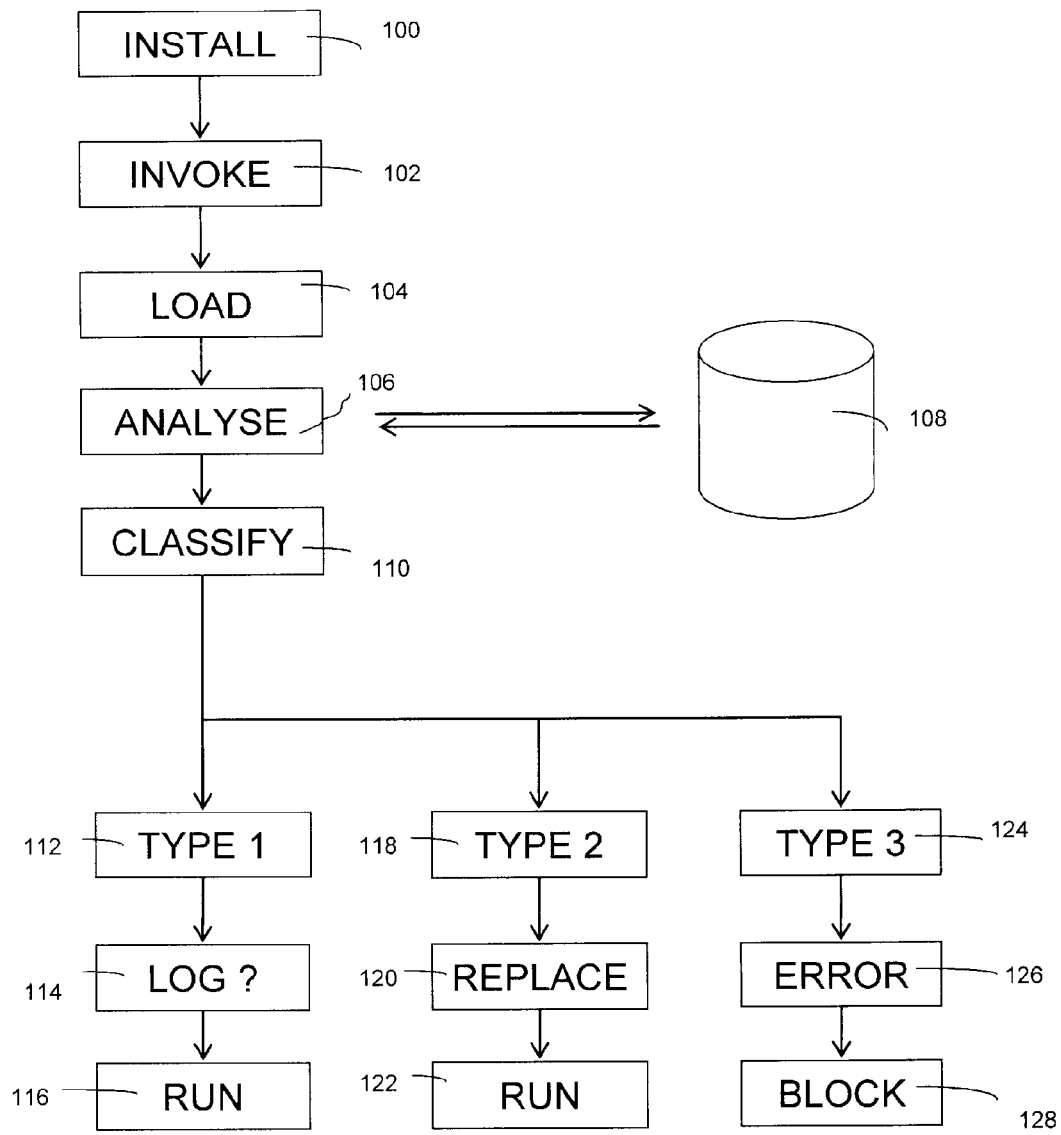
FIG. 2 is a flow chart representation of a method according to the present invention.

The process according to the present invention is generally illustrated by the flowchart of FIG. 2. The process begins at step 100 with the loading/installation of an application on a controlling application server (which will typically comprise loading into RAM 12 for handling by CPU 10 in the system of FIG. 1). The application may consist of many different classes and/or packages of unknown or unproven origin, such that identification and classification is required to determine whether they may be safely used. In the following example the term "classes" will be used to generally cover software classes, packages, subroutines and other software code fragments that may be downloaded.

At step 102, a user invokes the application: it is a particular feature of the present invention that the process operates at run-time and only in respect of classes when they are first used by an application. In response to the invocation, at step 104 the classes associated with the application are loaded.

At step 106, each of the loaded classes is analysed by identifying one or more features thereof and checking said one or more features by reference to a configurable set of rules held in database 108, and at step 110 each loaded class is classified. The steps of analysis and classification are described in greater detail below with reference to FIG. 3.

The outcome of the classification step 110 is that each class is classified as one of a number of types, of which three (Type 1, Type 2, Type 3) are shown in the present example. As will become apparent from the description below, the present invention is not limited to three classes, and the naming convention used herein should not be taken as implying any hierarchical ranking or order of processing of the types.

A component classified as a first component type at step 112 is deemed safe to run at step 116 without amendment. However, the first component type may be given a secondary classification by the analysis step 106 indicating that further analysis is required or desirable, but that such further analysis need not prevent running. In such an instance, the class may be logged at step 114 for further investigation and proceed to step 116 before the investigation occurs or is completed. As will be recognised, this secondary classification of a first type might alternately be described as a fourth component type.

Where step 110 results in a class being classified as a second component type, at step 118, the class is deemed unusable but recognised, in which case it is replaced at step 120 by a component of equivalent functionality prior to running at step 122. Such a situation may occur where a software routine written in open-source is identified, the license conditions of which make it unsuitable for use, but an alternate routine (for example written in-house) is available and may be substituted.

Where step 110 results in a class being classified as a third component type, at step 124, the class is deemed unusable and is blocked from running at step 128. In such a case, an error message may be created and sent to a user of the system, at step 126. A class may be deemed unusable if it matches a stored list of prohibited classes and no alternate is available for local substitution locally (as at step 120). Alternately, in the most secure configuration, any class that cannot be fully and satisfactorily identified is deemed to be a Type 3 and is blocked.

One particular application of the present invention is to log the packages and/or classes and/or methods used by a cloud service. If this cloud service was implemented in Java™, then a straightforward package level trace could be used. The granularity of this logging may be configurable from fairly large "package" level type of access down to very precise "method" invocations, depending on required usage. This data can then be analyzed for patterns (such as "com.ibm", "org.apache" or "org.osgi" etc.) and any identified pattern may be looked up in a database of cleared open-source or third party packages to determine whether the code is cleared for usage.

Figure 3:
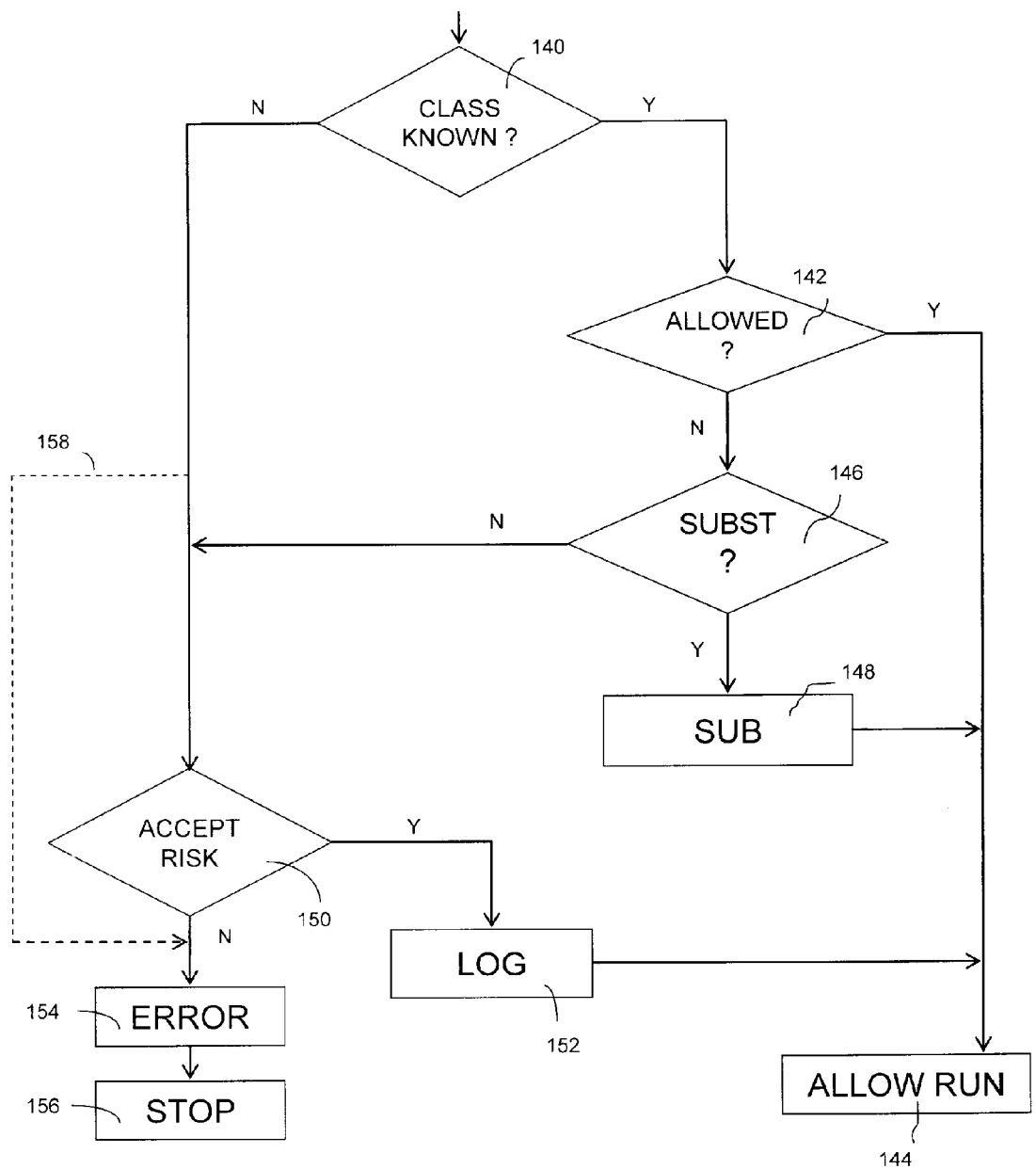
FIG. 3 shows in greater detail an arrangement of the analysis and classification steps of FIG. 2.

The steps of analysis and classification are shown in greater detail in FIG. 3, starting at step 140 in which a loaded class is checked as to whether it is known (that is to say whether its type and/or characteristics are identified by the system). If so, the method proceeds to step 142 where a determination is made as to whether the class is allowed to run without further checking—for example it may be identified on a list of "safe" classes. If so, then at step 144 it is allowed to run.

If the check at step 142 determines that the class is recognised but not allowed to run without further check, the process moves to step 146 where it is determined whether an acceptable local substitute for the class is available. If so, then at step 148 the identified class is substituted and the substitute class is allowed to run at step 144. For example, if the identified class defines a 256-bit coding algorithm but the local store does not have a replacement 256-bit algorithm available, it may still be deemed acceptable to replace the identified class with a locally-sourced 64-bit coding algorithm.

If the class is unknown (step 140) or it is known but no local substitute is available (step 146) then the procedure moves to step 150 where it is determined whether running the class represents an acceptable risk or an unacceptable problem. This determination may take into account the intended functionality of the class and/or its origins. For example a straightforward mathematical operator may be adjudged an acceptable risk, whilst a utility having access to a user's private data may be classified as unacceptable. Similarly, a utility originating from a known "friendly" source may be adjudged an acceptable risk, whilst one originating from a known hostile state (or simply from an unidentifiable source) may be classed as unacceptable.

If the determination at step 150 classifies a class under consideration as an acceptable risk, then the procedure moves to step 152 at which the acceptance of the class is logged for possible later more detailed investigation, after which the class is allowed to run at step 144. If, however, step 150 determines the risk as unacceptable, then at step 154 an error message is generated and the process ends at step 156.

As shown by dashed line 158, it may be a policy decision enforced by the system that any class that is not known or satisfactorily identified by step 140 has to be considered an unacceptable risk, in which case step 150 may be bypassed.

A particular benefit arising from the run-time analysis and classification scheme provided by the present invention is that it enables ongoing usage of class types to be monitored, suitably by determining the percentage that fall into each of the first, second and third component types. This monitoring has particular benefit where a particular identified first component type is accessed under particular licensing conditions and/or a fee payment schedule. By reference to the database holding class (component type) details, the system may determine whether there is a charge associated with usage of that first component type and, if so, it can periodically determine an accumulated charge resulting from actual usage of the identified first component. The determining of accumulated charge may include determining usage of all loaded components and identifying the percentage of that usage involving said identified first component type. With such an arrangement, a user may make considerable savings (compared to one-off or flat-rate payment schemes) in respect of classes/components that are rarely used.

Figure 4:
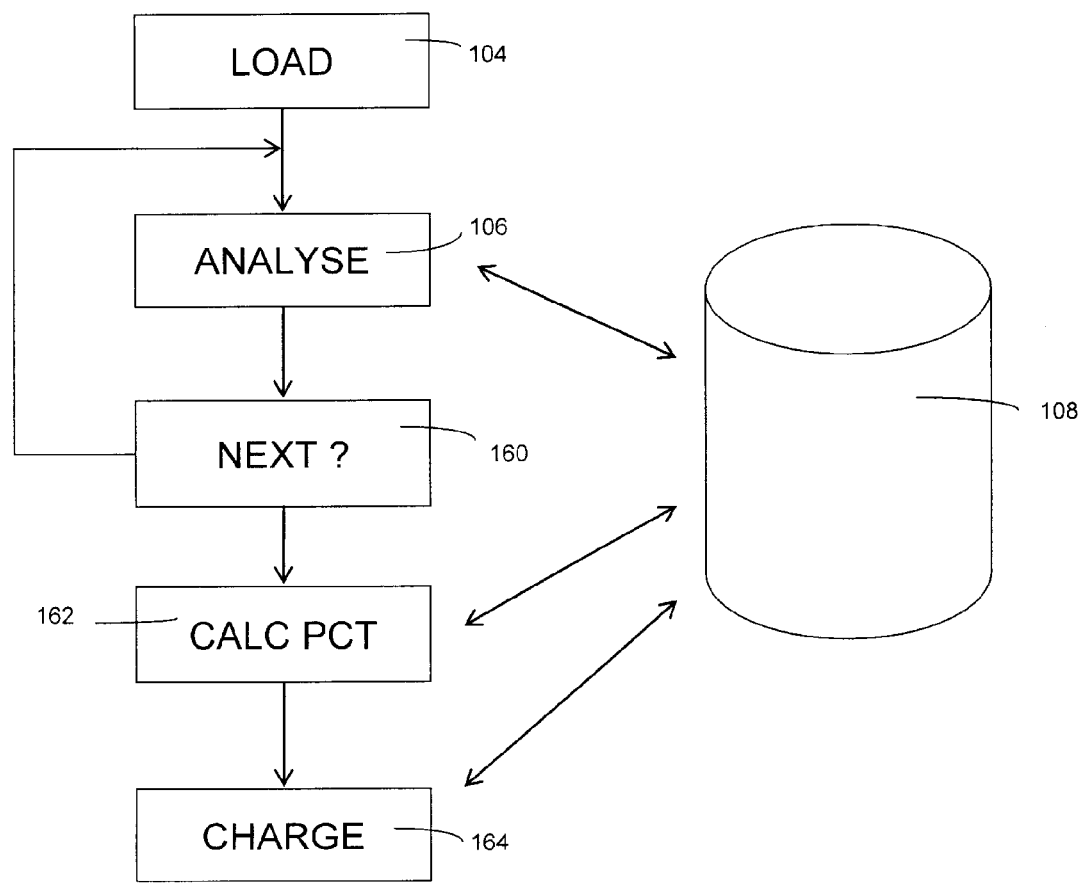
FIG. 4 is a flow chart representation of a usage determination and charging process.

FIG. 4 schematically represents one arrangement for determining accumulated charge, starting as before at step 104 with the loading of an application. At step 106, the individual classes/components are analysed by reference to database 108, with step 160 providing a return loop to step 106 until all classes/components have been checked. As described in the preceding paragraph, the step 106 of analysis determines the usage of each class/component and stores this information in the database 108. At step 162, when all classes have been loaded and analysed, the storage usage data from database 108 is used to determine the percentage of total usage represented by each class, which data is again stored in database 108. At step 164, again by reference to database 108, the charging details for an individual class are combined with the determined percentage usage for that class and a resulting charge produced.

It is recognized that some software providers may be unwilling to support such a charging schedule arrangement, but others will recognise that it may have benefits, particularly if combined with arrangements for providing usage statistics as feedback to providers.

It will be understood that there are a number of different methods by which a class/component may be identified as part of an analysis and classification process according to the present invention, as will now be described with reference to FIGS. 5A to 5D.

Figure 5A:
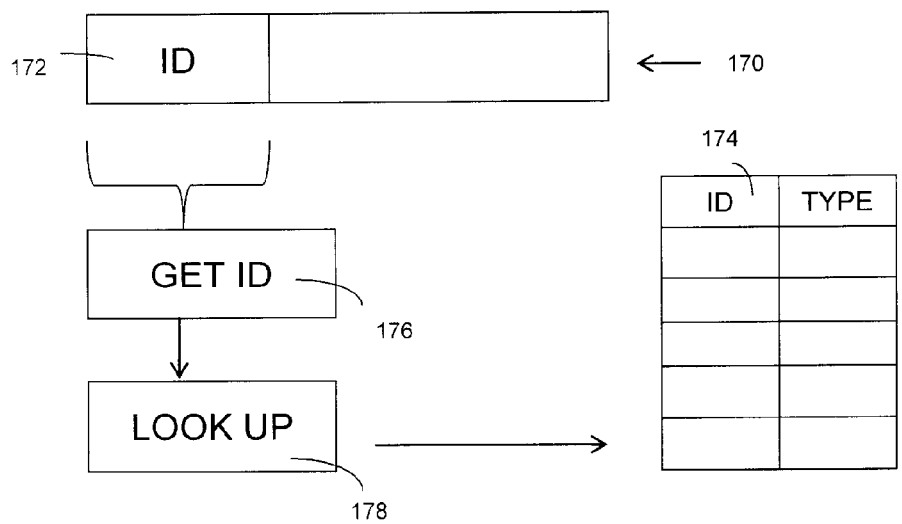
FIGS. 5A to 5D represent alternate analysis procedures for identifying software code.

As shown in FIG. 5A each software component 170 has an associated package name or identifier 172, the database 108 contains a table 174 of identifiers with a component type specified for each, and the step of analysing comprises extracting the identifier 176 and looking it up 178 in the database table 174 to determine the type.

Figure 5B:
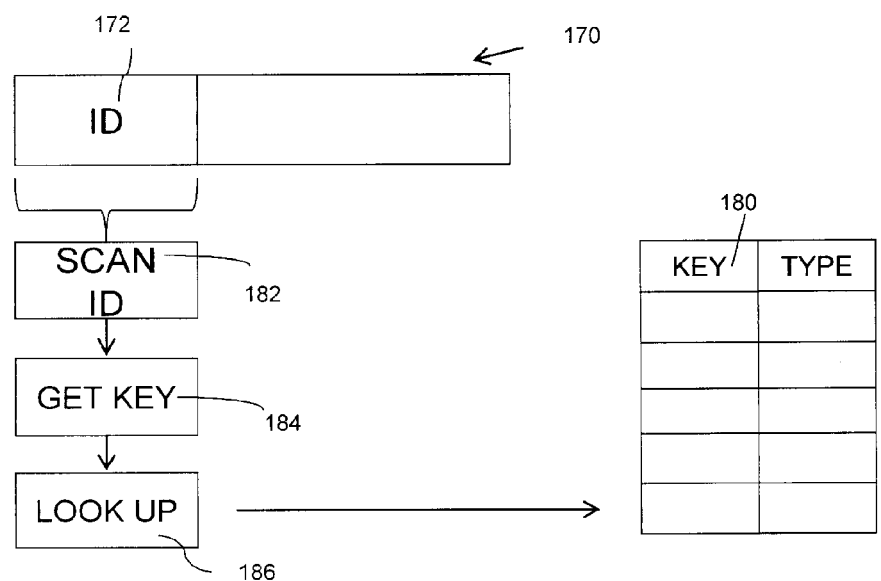

In FIG. 5B, as for FIG. 5A, each software component 170 has an associated identifier 172. In this example, the database contains a table 180 of key portions or keywords with a component type specified for each, and the step of analysing comprises scanning the identifier of a code portion 182 to identify 184 one or more of the key portions therein and then looking up 186 the identified key portion or portions in the database table 180 to determine the type.

Figure 5C:
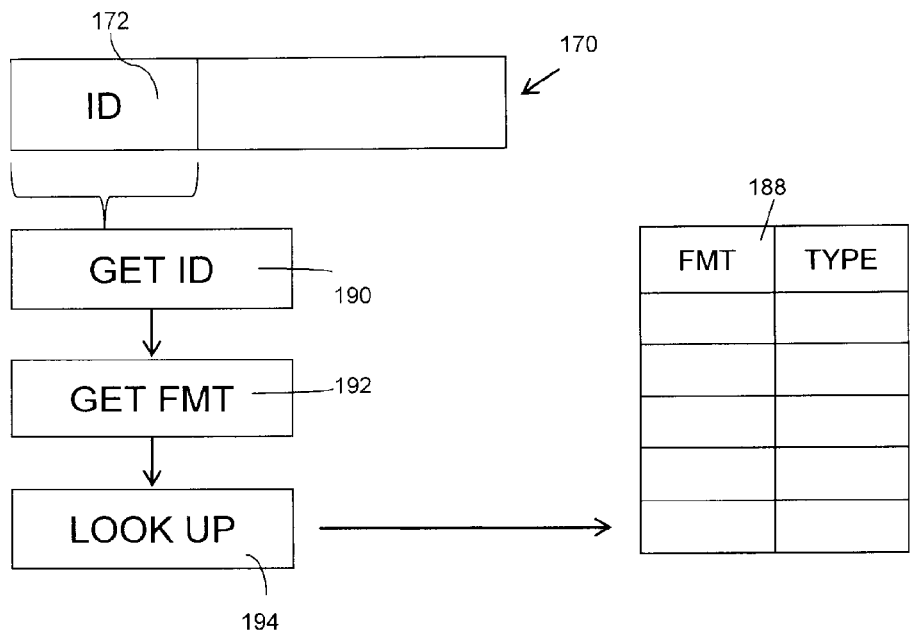

In FIG. 5C, as for FIGS. 5A and 5B, each software component 170 has an associated identifier 172. In this example, the database contains a table 188 of identifier formats, and the step of analysing comprises extracting the identifier 190, identifying the format thereof 192, and determining 194 whether the identifier of a downloaded component has an identifier in a format stored in the database table 188. If not, it may suitably be determined that the type for that downloaded component is the third type (that is to say it should not be allowed to run).

Figure 5D:
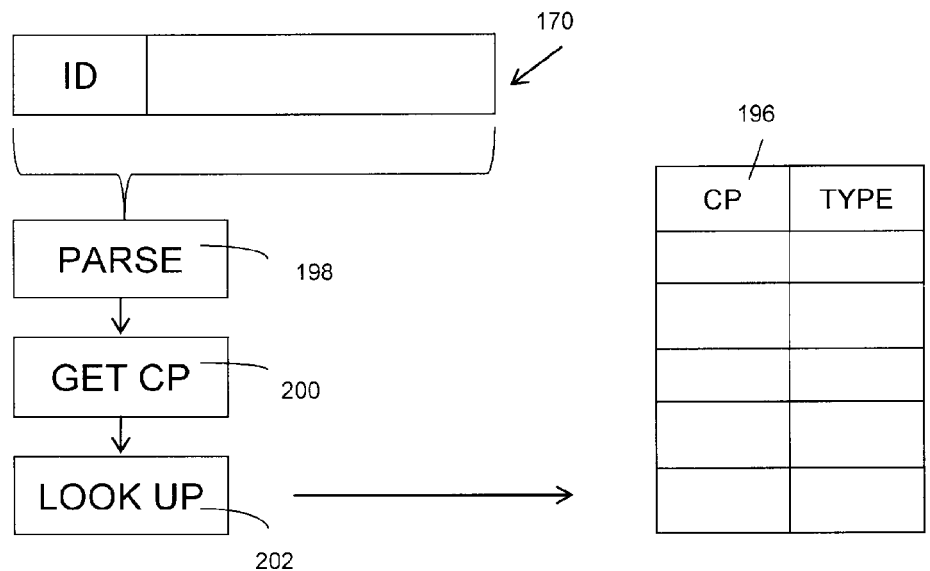

In the example of FIG. 5D, the database contains an inventory 196 of software code portions (CP) with a component type specified for each. In this case, the step of analysing comprises parsing 198 a downloaded code portion to identify 200 the presence therein of any such inventoried code portions, and then comparing 202 the same with the database table 196 to determine the type. This last example may be extended to identify "near-misses" that is to say code portions which are close to expected code portions but wrong. For example, a source address for a piece of code that differs by a single character from an expected address may suggest a malicious source trying to pass itself off as a genuine source (which might well be overlooked by a manual scan).

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer program product comprising:
   one or more computer-readable, tangible storage devices;
   program instructions, stored on at least one of the one or more storage devices, to load a software component;
   program instructions, stored on at least one of the one or more storage devices, to analyze the software component by identifying one or more features thereof and checking said one or more features against a database;
   program instructions, stored on at least one of the one or more storage devices, to classify the software component as one of a set of component types, wherein the classifying of the component comprises classifying the component as one of at least first, second and third component types; wherein a component classified as a first component type is run without amendment; wherein a component classified as a second component type is replaced by a component of equivalent functionality prior to running; and wherein a component classified as a third component type is blocked from running, wherein the classification of a component as of third component type triggers the generation of an error message; and program instructions, stored on at least one of the one or more storage devices, to perform an action on the component, which action is dictated by the component type.

2. The computer program product of claim 1, wherein a component classified as a first component type is given a secondary classification by the analysis step indicating whether or not further analysis is required.

3. The computer program product of claim 1, wherein when the analyzing is unable to classify a component as being of first, second or third component types, the component is allocated the third component type and blocked from running.

4. The computer program product of claim 1, comprising:
program instructions, stored on at least one of the one or more storage devices, to load a plurality of components and, for said plurality, determining the percentage that fall into each of the set of component types.

5. The computer program of claim 1, wherein each software component has an associated identifier, the database contains a table of identifiers with a component type specified for each, and the step of analyzing comprises looking up the identifier in the database to determine the type.

6. The computer program product of claim 1, wherein each software component has an associated identifier, the database contains a table of key portions with a component type specified for each, and the step of analyzing comprises scanning the identifier of a code portion to identify one or more of said key portions therein and looking up the identified key portion or portions in the database to determine the type.

7. The computer program product of claim 1, further comprising program instructions, stored on at least one of the one or more storage devices to determine, for an identified first component type and by reference to the database, whether there is a charge associated with usage of that first component type and, if so, periodically determining an accumulated charge resulting from actual usage of the identified first component.

8. A computer system comprising:
one or more processors, one or more computer-readable memories and one or more computer-readable, tangible storage devices; program instructions, stored on at least one of the one or more storage devices for execution by at least one of the one or more processors via at least one of the one or more memories, to load a software component;
program instructions, stored on at least one of the one or more storage devices for execution by at least one of the one or more processors via at least one of the one or more memories, to analyze the software component by identifying one or more features thereof and checking said one or more features against a database;
program instructions, stored on at least one of the one or more storage devices for execution by at least one of the one or more processors via at least one of the one or more memories, to classify the software component as one of a set of component types, wherein the classifying of the software component comprises classifying the component as one of at least first, second and third component types; wherein a component classified as a first component type is run without amendment; wherein a component classified as a second component type is replaced by a component of equivalent functionality prior to running; and wherein a component classified as a third component type is blocked from running; and
program instructions, stored on at least one of the one or more storage devices for execution by at least one of the one or more processors via at least one of the one or more memories, to perform an action on the component, which action is dictated by the component type.

9. The computer system of claim 8, wherein the computer system is configured to load a plurality of components and, for said plurality, determining the percentage that fall into each of the set of component types.

10. The computer system of claim 8, wherein each software component has an associated identifier, the database contains a table of identifiers with a component type specified for each, and the step of analyzing comprises looking up the identifier in the database to determine the type.

11. The computer system of claim 8, wherein each software component has an associated identifier, the database contains a table of key portions with a component type specified for each, and the step of analyzing comprises scanning the identifier of a code portion to identify one or more of said key portions therein and looking up the identified key portion or portions in the database to determine the type.

12. The computer system of claim 8, wherein a component classified as a first component type is given a secondary classification by the analysis step indicating whether or not further analysis is required.

13. The computer system of claim 8, wherein when the analyzing is unable to classify a component as being of first, second or third component types, the component is allocated the third component type and blocked from running.

14. The computer system of claim 8, further comprising program instructions, stored on at least one of the one or more storage devices to determine, for an identified first component type and by reference to the database, whether there is a charge associated with usage of that first component type and, if so, periodically determining an accumulated charge resulting from actual usage of the identified first component.

15. A computer program product comprising:
one or more computer-readable, tangible storage devices;
program instructions, stored on at least one of the one or more storage devices, to load a software component;
program instructions, stored on at least one of the one or more storage devices, to analyze the software component by identifying one or more features thereof and checking said one or more features against a database;
program instructions, stored on at least one of the one or more storage devices, to classify the software component as one of a set of component types, wherein the classifying of the component comprises classifying the component as one of at least first, second and third component types; wherein a component classified as a first component type is run without amendment; wherein a component classified as a second component type is replaced by a component of equivalent functionality prior to running, wherein the classification of a component as of third component type triggers the generation of an error message;
program instructions, stored on at least one of the one or more storage devices, to perform an action on the component, which action is dictated by the component type; and,
program instructions, stored on at least one of the one or more storage devices to determine, for an identified first component type and by reference to the database, whether there is a charge associated with usage of that first component type and, if so, periodically determining an accumulated charge resulting from actual usage of the identified first component.

16. The computer program product of claim 15, wherein a component classified as a first component type is given a secondary classification by the analysis step indicating whether or not further analysis is required.

17. The computer program product of claim 15, further comprising:
program instructions, stored on at least one of the one or more storage devices, to load a plurality of components and, for said plurality, determining the percentage that fall into each of the set of component types.

18. The computer program product of claim 15, wherein each software component has an associated identifier, the database contains a table of identifiers with a component type specified for each, and the step of analyzing comprises looking up the identifier in the database to determine the type.

19. The computer program product of claim 15, wherein each software component has an associated identifier, the database contains a table of key portions with a component type specified for each, and the step of analyzing comprises scanning the identifier of a code portion to identify one or more of said key portions therein and looking up the identified key portion or portions in the database to determine the type.

* * * * *